(No Model.)

M. F. C. STOCKMANN.
METHOD OF TEACHING EMBROIDERY OR KINDRED ARTS TO THE BLIND.

No. 532,110. Patented Jan. 8, 1895.

- . 1 Copper Red
- .. 11 Copper Red
- ... 111 Copper Red
- : 1 Pale Blue
- :: 11 Blue
- ::: 111 Blue
- ·: Olive Green
- ·.: Sage

- ○ Light Wood Brown
- ☐ Dark Wood Brown

WITNESSES:
Pierson L. Wells.
Jac. Allemann Jr.

INVENTOR
Marie F. C. Stockmann
BY Edwin H. Brown
HER ATTORNEY

United States Patent Office.

MARIE F. C. STOCKMANN, OF NEW YORK, N. Y.

METHOD OF TEACHING EMBROIDERY OR KINDRED ARTS TO THE BLIND.

SPECIFICATION forming part of Letters Patent No. 532,110, dated January 8, 1895.

Application filed October 19, 1894. Serial No. 526,410. (No model.)

*To all whom it may concern:*

Be it known that I, MARIE F. C. STOCKMANN, a subject of the Emperor of Germany, residing in the city of New York, in the county and State of New York, have invented a certain new and useful Improvement in Methods of Teaching Embroidery or Kindred Arts to the Blind, of which the following is a specification.

My invention relates to a method for teaching the blind and is particularly directed toward the teaching of embroidery and kindred arts.

In carrying out my invention, I make use of pieces of material whose surfaces have been prepared in a manner to be hereinafter explained, such preparation embodying characters or symbols which appeal to the blind through their sense of touch. In combination with these prepared surfaces, I employ a key or index in which the pupil may find an explanation, or definition, as it were, of the characters or symbols on the prepared surface, and by the aid of which he may treat the surface in a manner suitable to the purpose in hand.

Figure 2:
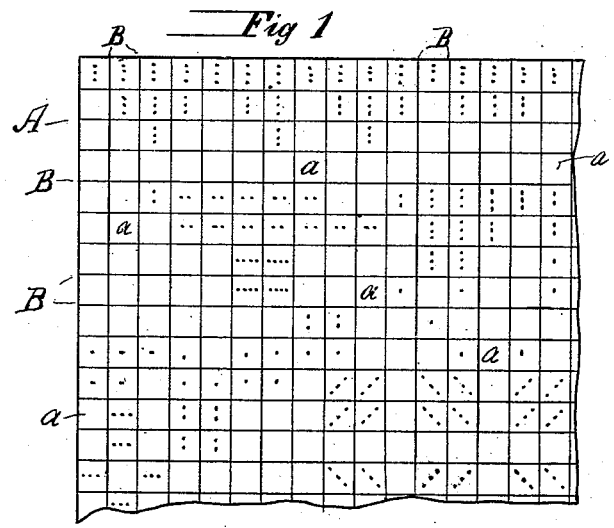
Figure 4:
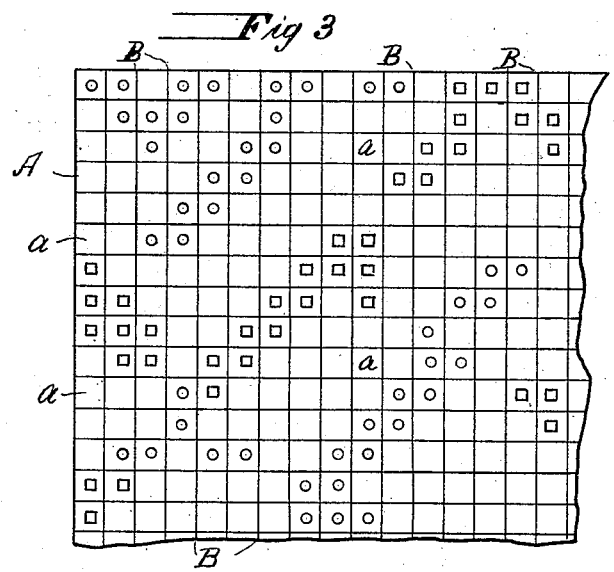

In the accompanying drawings, Figure 1 represents a surface which has been prepared according to my invention. Fig. 2 is a key or index serving to explain Fig. 1. Fig. 3 represents a surface which has been prepared according to my invention, but illustrates a modification. Fig. 4 is a key or index serving to explain Fig. 3.

Similar letters of reference indicate corresponding parts.

Although my invention is especially adapted to the purpose of facilitating the teaching of embroidery, and I have described it as more particularly referring to this art throughout the specification, it may be utilized as well for teaching other arts, such as painting, or in general, ornamenting of any kind where surfaces are figured or designed.

The surface to be embroidered is divided into blocks or panels of a suitable shape, for instance, these panels or blocks may be polygonal in outline, forming squares or triangles, or they may be circular. The dividing lines separating the panels or blocks are so drawn or arranged on the material as to be readily distinguished by a blind person on feeling of the surface. These dividing lines are preferably in the form of continuous raised lines embossed upon the surface. They may, however, be of any other formation which will give to a blind person intimation of the presence and size of the panels or blocks.

A represents material, for instance, paper, whose surface has been embossed along lines B dividing the surface into blocks or panels $a$. These panels or blocks $a$ are here shown as being in the form of squares. The surface to be embroidered is mapped out in these blocks or panels $a$. If found desirable panels or blocks of different outlines, as squares and triangles, may be mapped out on the same surface. The panels or blocks are grouped together to form any desirable design, and on each of the individual panels or blocks there is impressed some character or symbol which may be readily distinguished by a blind person through his sense of touch, and which on reference to a key or index will indicate to him what color or shade of color is to be applied to that particular panel. In Fig. 1 I have represented these signs or symbols as consisting of one or more perforations. These perforations may be made by a suitable instrument as a pin passing through the paper from below upward, when a burr or raised edge is left upon the upper surface where the perforation passes through the surface. In this condition the number and disposition of the perforations in each panel or block are readily distinguished by a blind person on passing his fingers over the surface.

Fig. 2 is a key or index serving to explain the characters used in Fig. 1 and showing what color or shade of color of silk, worsted or other material is to be applied to the several blocks or panels of the design. I have shown in this figure a particular arrangement of perforations with the colors which correspond to them, but of course I do not limit myself to this specific arrangement, as it is evident that the assignment of any color or shade thereof to a particular character or symbol, is arbitrary, if such fact is borne in mind in arranging the design.

As shown in Fig. 2 a single perforation may indicate copper color; two perforations arranged horizontally, a different shade of copper red; two perforations arranged vertically, a pale blue; three perforations arranged horizontally, a third shade of copper red; three perforations arranged vertically, a blue; four perforations arranged vertically, another shade of blue; three perforations inclined to the right, an olive green; three perforations inclined to the left, a sage.

The material on which the design is to be embroidered may be a woven fabric, coarse enough to have its texture distinguished by a blind person by passing the fingers over it, or by sliding a needle along the surface. Materials of different sorts suitable for the different kinds of embroidery may be used and different stitches may be taught; as, for instance, cross stitch, flat stitch, Russian flat stitch, Gobelin, and various other stitches well known to those skilled in the art.

If a woven fabric is used for the material which is to be embroidered, the marking out of the material into panels or blocks may be greatly facilitated by utilizing the threads of the fabric itself to assist in indicating the separate blocks or panels.

Fig. 3 illustrates another method of forming the characters or symbols upon the material. As here represented, these characters or symbols are formed upon the panels or blocks of the surface by embossing the same in different shapes. I have shown two such shapes of embossed figures, for illustration, a rectangle and a circle. These embossed figures are located upon the panels or blocks which are grouped together to form the design as has been previously explained.

Reference to the key attached to Fig. 3 shows that the rectangular embossed figure requires an embroidering thread of a dark wood brown color, and the circular embossed figure an embroidering thread of a light wood brown color.

Having described my invention, what I consider as new, and desire to secure by Letters Patent, is—

1. A method of teaching embroidery to the blind, consisting in preparing the material to be embroidered by dividing the surface of the same into blocks or panels by division lines which are distinguishable by the blind, grouping the panels or blocks to form a design, marking each panel or block in the group by a character or symbol readily distinguished by the blind, and combining with the surface so prepared a key or index in which the color or shade of color of the embroidering thread which corresponds to each character or symbol is set forth, substantially as specified.

2. In a method for teaching embroidery to the blind, the combination with embroidery material whose surface has been marked out in blocks or panels, grouped in designs, and marked with symbols or characters distinguishable by the blind, of a key for indicating the colors of embroidery thread to be applied to each block of the group, substantially as specified.

3. The combination with an embroidery material having an embossed surface marked out into panels or blocks, of a key for indicating the colors to be applied to the several panels or blocks, substantially as specified.

In testimony whereof I have signed my name to this specification in the presence of two subscribing witnesses.

MARIE F. C. STOCKMANN.

Witnesses:
  J. HARRIS KNOWLES,
  GEORGE K. LISCOMB.